(12) United States Patent
Haroun et al.

(10) Patent No.: US 9,452,411 B2
(45) Date of Patent: Sep. 27, 2016

(54) DEVICE FOR INJECTING AND MIXING FLUIDS IN A DOWNWARD-FLOW REACTOR

(71) Applicant: IFP ENERGIES NOUVELLES, Rueil-Malmaison (FR)

(72) Inventors: Yacine Haroun, Grigny (FR); Frederic Augier, Saint Symphorien D Ozon (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 165 days.

(21) Appl. No.: 14/177,291

(22) Filed: Feb. 11, 2014

(65) Prior Publication Data

US 2014/0224707 A1 Aug. 14, 2014

(30) Foreign Application Priority Data

Feb. 12, 2013 (FR) ...................................... 13 51185

(51) Int. Cl.
 *B01J 19/18* (2006.01)
 *B01J 8/04* (2006.01)

(52) U.S. Cl.
 CPC ............ *B01J 19/1862* (2013.01); *B01J 8/0453* (2013.01); *B01J 8/0492* (2013.01); *B01J 8/0496* (2013.01); *B01J 2208/00362* (2013.01); *B01J 2208/00371* (2013.01)

(58) Field of Classification Search
 CPC ............................. B01J 8/0492; B01J 8/0453
 See application file for complete search history.

(56) References Cited

U.S. PATENT DOCUMENTS

| | | |
|---|---|---|
| 2003/0031612 A1 | 2/2003 | Raynal et al. |
| 2007/0248510 A1 | 10/2007 | Dean et al. |
| 2011/0123410 A1* | 5/2011 | Augier .................. B01J 8/0453 422/211 |

FOREIGN PATENT DOCUMENTS

FR 2826594 A1 1/2003

OTHER PUBLICATIONS

Search Report dated Jun. 5, 2013 issued in corresponding FR 1351185 application (pages 1-2).

* cited by examiner

*Primary Examiner* — Randy Boyer
(74) *Attorney, Agent, or Firm* — Millen White Zelano & Branigan, PC

(57) ABSTRACT

The catalytic reactor with downward flow comprises a chamber (1) containing at least two solid catalyst beds (2; 11) separated by an intermediate zone comprising an essentially horizontal collecting plate (5) communicating with a vertical collecting pipe (7) for receiving fluids collected by the collecting plate, with a means for injecting a quenching fluid (8) emptying into the collecting pipe. An annular mixing chamber (9) is located below the collecting plate (5). A predistribution plate (11) is arranged below the chamber (9).

The injection means (8) comprises a tubular portion that empties into the collecting pipe (7) in such a way as to inject quenching fluid in a direction forming an angle θ between 45° and 135° with the direction D from the axis of the mixing chamber measured at its input end.

21 Claims, 6 Drawing Sheets

DEVICE FOR INJECTING AND MIXING FLUIDS IN A DOWNWARD-FLOW REACTOR

FIELD OF THE INVENTION

The invention applies within the field of exothermic reactions and more particularly to reactions of hydrotreatment, hydrodesulfurization, hydrodenitration, hydrocracking, hydrogenation, and hydrodearomatization carried out in a reactor. This invention relates to a device for injecting and mixing a quenching fluid in a downward-flow reactor and its use for implementing exothermic reactions. The invention also relates to a reactor that comprises a compact mixing device.

EXAMINATION OF THE PRIOR ART

The exothermic reactions carried out in refining and/or in petrochemistry require being cooled by an additional fluid to prevent a heat excursion from the reactor in which they are carried out. It is also necessary to keep a homogeneous temperature gradient within the reactor so as to prevent the existence of hot points in the catalyst bed. These hot points can prematurely decrease the activity of the catalyst. They also lead to non-selective reactions. It is therefore important to use at least one mixing chamber in a reactor that makes possible a homogeneous temperature distribution of the fluids and a cooling of the reaction fluids to a desired temperature.

To carry out this homogenization, one skilled in the art is often led to use a specific arrangement of internals in a reactor making possible an introduction of the most homogeneous quenching fluid possible in the cross-section of the reactor.

For example, the document FR-A-2,824,495 describes a quenching device that makes it possible to ensure an effective exchange between the quenching fluid or fluids and the fluid or fluids of the process. This device is integrated into a chamber and comprises a rod for injecting quenching fluid, a baffle for collecting fluids, with the quenching box itself performing the mixing between the quenching fluid and the downward flow, and a distribution system consisting of a perforated basin and a distributor plate. The quenching box comprises a deflector ensuring that the fluids are put into vortex motion in a direction that is essentially not radial and not parallel to the axis of said chamber and downstream from the deflector, in the direction of circulation of the reaction fluid, at least one cross-section of the exit passage of the mixture of fluids formed in the box. This device makes it possible to remedy certain drawbacks of the different systems of the prior art but remains very bulky.

Certain current devices make it possible to reduce this bulkiness. For example, the documents U.S. Pat. No. 6,881,387, EP-B-1,721,660 and U.S. Pat. No. 6,180,068 describe flatter mixing boxes than those of the prior art. However, these quenching boxes also comprise many internals that, to be effective, are able to produce strong pressure drops.

The document US2011/0123410 describes a device for mixing fluid arranged between two catalyst beds contained in a downward-flow reactor. The mixing between the fluids flowing into the reactor and the quenching fluid injected into the mixing device is carried out in an annular mixing chamber.

This invention therefore has as its object to improve the mixing of fluids carried out by the fluid mixing device described by the document US2011/0123410 by proposing injecting the quenching fluid in a direction forming an angle of between 45° and 135°, preferably essentially perpendicular, to the direction of the axis of the mixing chamber.

SUMMARY DESCRIPTION OF THE INVENTION

In a general manner, the invention has as its object a catalytic reactor with downward flow comprising a chamber that contains at least two solid catalyst beds separated by an intermediate zone comprising a device for mixing fluids, with the device comprising:

At least one essentially horizontal collecting plate communicating with a vertical collecting pipe for receiving the fluids collected by the collecting plate, At least one means for injecting a quenching fluid emptying into said collecting pipe, An annular mixing chamber located below the plate, said chamber comprising an input end directly connected to said collecting pipe and an output end for evacuating the fluids, and A predistribution plate comprising a number of perforations and comprising at least one shaft, said plate located below said chamber.

The reactor is characterized in that the injection means comprises a tubular portion that empties into said vertical collecting pipe, with said tubular portion having a straight axis forming an angle $\theta$ with a direction D from the axis of the mixing chamber, where the direction D is measured at said input end, with the angle $\theta$ being between 45° and 135°.

According to the invention, the axis of the tubular portion can be essentially horizontal. The angle $\theta$ can be between 80° and 100°.

The vertical collecting pipe can have a circular cross-section, and the injection means can be arranged in such a way that the distance h1 between the axis of the tubular portion and the axis of the vertical collecting pipe is between 0 and the radius of said vertical collecting pipe.

For example, the distance h1 can be equal to 0 in such a way that the axis of the tubular portion crosses the axis of the vertical collecting pipe. Alternatively, the distance h1 can be equal to approximately the radius of said vertical collecting pipe in such a way that the axis of the tubular portion is tangent to the wall of the vertical collecting pipe.

Said plate can be located below said chamber at a distance d2 of between 0 and 100 mm. For example, the distance d2 can be equal to 0 mm, with the annular mixing chamber being in contact with the distribution plate. Preferably, the distance d2 is between 0.25 and 100 mm, preferably between 0.5 and 5 mm.

The annular mixing chamber can be positioned on the periphery of the chamber of the reactor.

Said annular chamber can consist of a pipe portion having an arched axis.

The annular mixing chamber can be positioned at a distance d1 from the chamber of the reactor, with the distance d1 varying from 0.5% to 25% of the diameter of the chamber of the reactor.

The diameter d of said annular mixing chamber can be between 0.05 and 0.5 m, preferably between 0.1 and 0.3 m, and in an even more preferred manner between 0.15 and 0.25 m.

The length of said annular mixing chamber can be between 90 and 270 degrees, more preferably between 100 and 250 degrees, and in an even more preferred manner 130 and 200 degrees.

The reactor can also comprise an essentially horizontal distribution plate, positioned below the predistribution plate.

The reactor according to the invention can be used in a process in which at least one reaction fluid is made to circulate from the top to the bottom of said reactor through at least one catalyst bed and in which a quenching fluid is injected in said injection means.

SUMMARY DESCRIPTION OF THE FIGURES

DETAILED DESCRIPTION OF THE INVENTION

Figure 1:
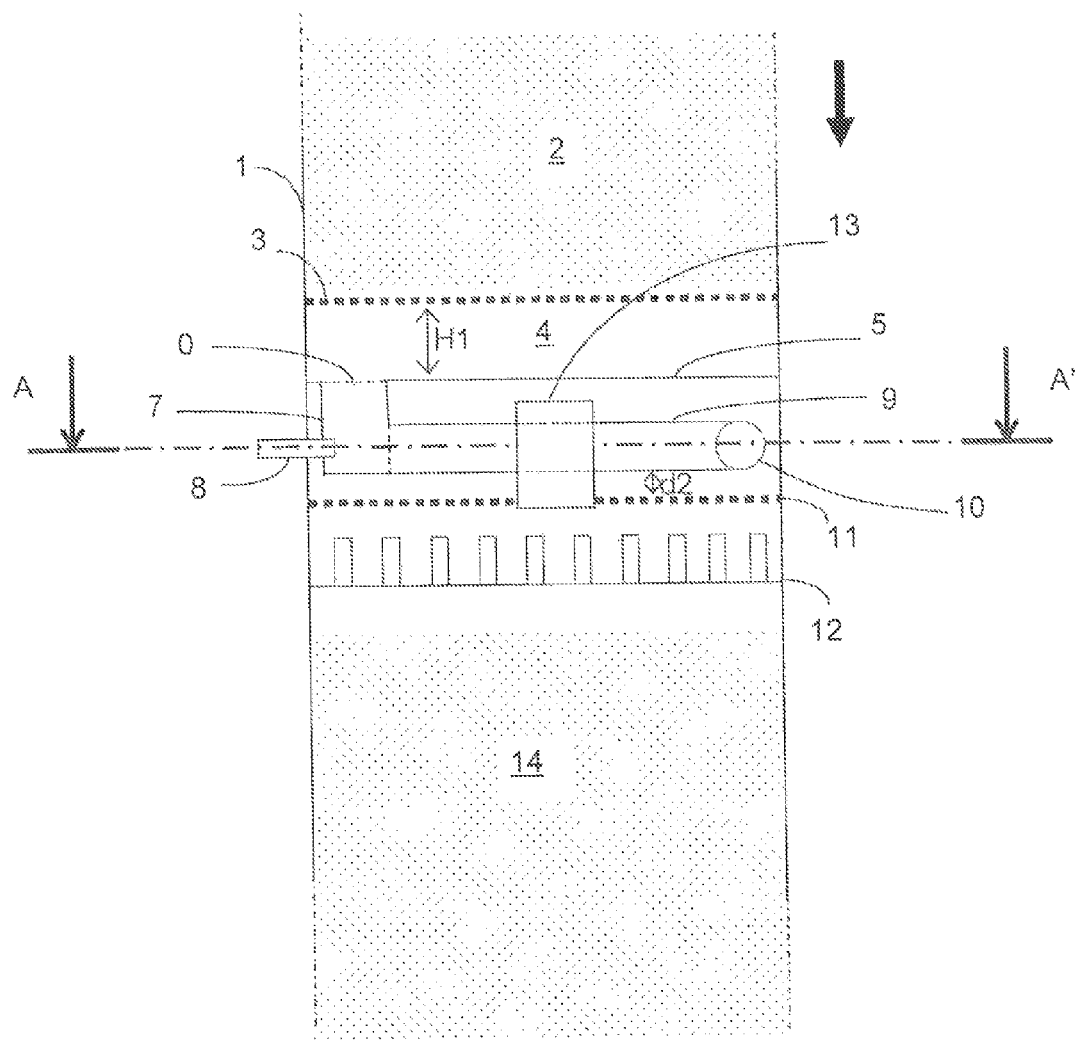
FIG. 1 shows an axial cutaway of a multi-bed reactor with downward flow comprising the compact mixing device according to the invention. The arrow in bold shows the direction of flow of fluids in the reactor.

FIG. 1 shows a reactor portion according to an embodiment of the invention, in which exothermic reactions, such as reactions of hydrotreatment, hydrodesulfurization, hydrodenitration, hydrocracking, hydrogenation, and hydrodearomatization, are carried out. The reactor consists of a chamber 1 that contains at least one solid catalyst bed 2. In general, the chamber has an elongated shape along an essentially vertical axis. For example, the chamber 1 has the shape of a cylinder that is closed at its ends, with the axis of the cylinder being oriented in a vertical direction. The cylinder can have a diameter of between 1 and 10 meters, and a height of between 3 and 20 meters. The reactor is supplied in the upper part with reaction fluid, composed of a gas or a liquid or a mixture containing liquid or gas, for example a hydrocarbon feedstock that is at least partly liquid and gaseous hydrogen. The reaction fluid (or process fluid, in English terminology) is made to circulate, in particular under the effect of gravity, from the top to the bottom of the reactor through at least the catalyst bed 2. In other words, the gas and the liquid flow in co-current from the top to the bottom in the reactor. The reaction between the reagents is catalyzed by a catalyst solid, which can be in the form of extrudates or balls placed between two grids for forming a bed that in general extends over the entire horizontal cross-section of the inside volume of the chamber 1. Because of the exothermic reaction, the volume of catalyst solid is divided into several beds. In FIG. 1, two beds 2 and 14 of solid catalysts are shown. In this description, downstream and upstream are defined relative to the direction of the flow of the reaction fluid.

The catalyst solid bed 2 is supported by a grid 3. Optionally, the bed 2 can be placed on a layer of inert solid grains, commonly called "grading," which itself rests on the grid 3.

An empty space 4 is located between the grid 3 and the collecting plate 5. The reaction fluid that circulates through the bed 2 empties into the empty space 4 called the collecting space below. The collecting plate 5 makes it possible to collect the reaction fluid that comes into the collecting space 4. For example, the collecting plate is a disk, for example horizontal, that covers the inside cross-section of the chamber 1.

The collecting plate 5, commonly called a "baffle," and connected to a collecting pipe 7 that extends along an essentially vertical axis [sic]. In terms of this invention, "essentially vertical," or "essentially horizontal," is defined as a variation of the slope of a plane or a straight line with respect to the vertical, or with respect to the horizontal, of an angle $\alpha$ of between ±5 degrees. The collecting plate 5 comprises an opening 0 that is connected to the collecting pipe 7. The collecting pipe 7 is therefore located below the collecting plate. The collecting plate 5 serves to collect the flow of the reaction fluid coming from the catalytic bed 2 upstream and directs this fluid toward the collecting pipe 7.

The collecting plate 5 is away from the grid 3 of the catalytic bed, which has a height H1, creating the collecting space 4. This space 4 makes possible the draining of the reaction fluid up to the collecting plate 5 and said pipe 7. The height H1 can be selected in such a way as to limit the pressure drop during the collecting of the fluid flowing from the catalyst bed 2 and to limit the shield height. The shield height should neither modify the drainage of the reaction fluid toward the collecting pipe 7 nor its flow into this pipe 7. In an embodiment of the invention, the height H1 is between 30 and 200 mm, preferably between 30 and 150 mm, and in an even more preferred manner between 40 and 100 mm. According to an embodiment of the invention, the height H1 is equal to 100 mm.

The collecting pipe 7 empties into an annular mixing chamber 9 at the input end of said chamber. This pipe 7 directs the flow of the reaction fluid and a quenching fluid, described below, into the mixing chamber 9. The diameter of the vertical collecting pipe 7 is selected in such a way as to limit the pressure drops. For example, the diameter can be selected in such a way as to limit the flow rate, in said collecting pipe 7, of the reaction fluid(s) coming from the catalyst bed 2 located upstream from the collecting plate 5. Preferably, the speed of said fluids in the pipe 7 is limited to a value of between 2 and 5° m·s$^{-1}$.

A quenching fluid is injected by an injection means 8 into the vertical collecting pipe 7. The injection means consists of a tubular portion that empties into the vertical collecting pipe 7. It can be a lateral tap, or a nozzle, or a pipe portion. The quenching fluid can be liquid or gas or a mixture containing liquid or gas. For example, the quenching fluid can be hydrogen.

Figure 2:
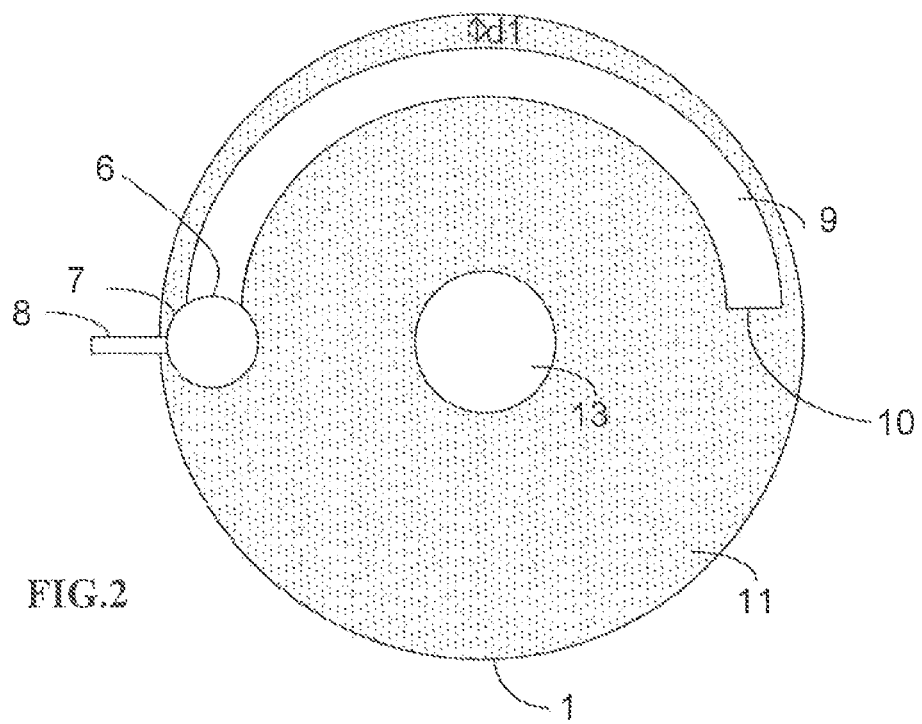
FIGS. 2 and 3 show a top view of the compact mixing device along the cutaway indicated by the line A-A' in dotted form.

FIG. 2 shows the injection means 8, the collecting pipe 7, and the mixing chamber 9 seen in cutaway along the axis AA' of FIG. 1. The reference 6 designates the intersection between the mixing chamber 9 and the collecting pipe 7. The reference 10 designates the output opening of the mixing chamber 9.

According to the invention, the end of the injection means 8 comprises a tube portion whose axis, in the form of a straight line, extends in a direction that forms an angle $\theta$ of between 45° and 145° relative to the direction of the axis of the annular mixing chamber 9, with the direction of the axis of the chamber 9 being measured at the connection 6 between the pipe 7 and the chamber 9.

Figure 3:
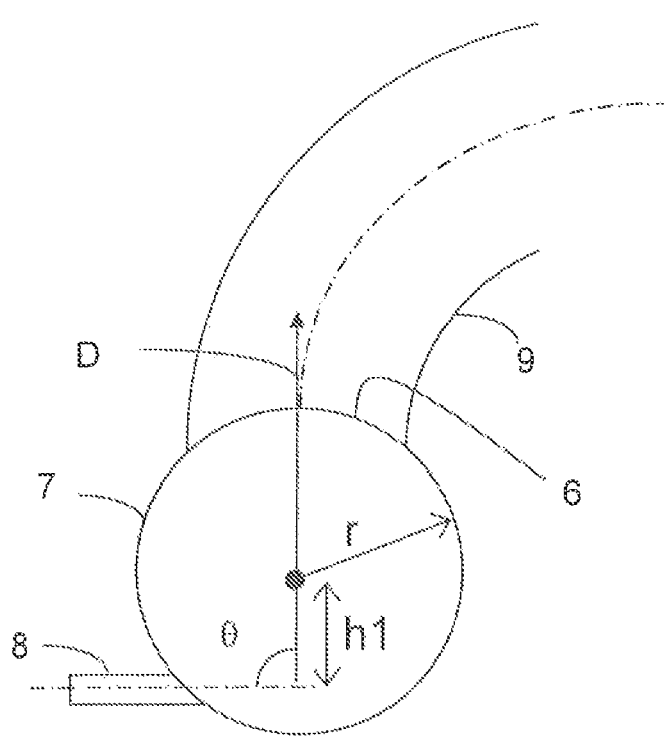

FIG. 3 shows an enlarged view of the collecting pipe 7 seen along a cutaway of the reactor shown by FIG. 1 along the axis AA'. The shape and, optionally, the dimensions of the pipe forming the end of the injection means 8 are selected in such a way that the direction of the straight axis of the pipe 8 is directed in a preferably essentially horizontal direction. In addition, the shape and, optionally, the dimensions of the pipe forming the end of the injection means 8 are selected in such a way that the direction of the straight axis of the pipe 8 forms an angle θ of between 45° and 145°, preferably of between 80° and 100°, and even between 85° and 95°, relative to the direction D corresponding to the direction of the axis of the annular mixing chamber 9 at the connection 6 between the collecting pipe 7 and the chamber 9. In other words, the axis of the end of the pipe 8 that is connected to the collecting pipe 7 forms the angle θ relative to the direction D of the axis of the mixing chamber 9 measured at the connection 6 between the pipe 7 of the chamber 9. Preferably, the end of the pipe 8 is a straight tubular portion, i.e., a tube portion whose axis extends along a straight line. The angle θ can be measured in absolute value without taking into account the direction of measurement.

The axis of the injection pipe 8 can be located at a different distance h1 from the center, i.e., the axis, of the collecting pipe 7. h1 corresponds to the smallest distance measured between the axis of the end of the injection pipe 8 and the axis of the pipe 7. The distance h1 can vary between the values 0 and r, with r being the value of the radius of the collecting pipe 7 in the case where the pipe has a circular cross-section. For example, when the distance h1 is equal to 0, the axis of the injection pipe 8 cuts or intersects the axis of the collecting pipe 7. When the distance h1 is approximately equal to r, the pipe 8 is tangent to the wall of the collecting pipe 7.

FIGS. 3A, 3B, 3C and 3D represent different arrangements of the injection means 8 according to the invention.

Figure 3A:
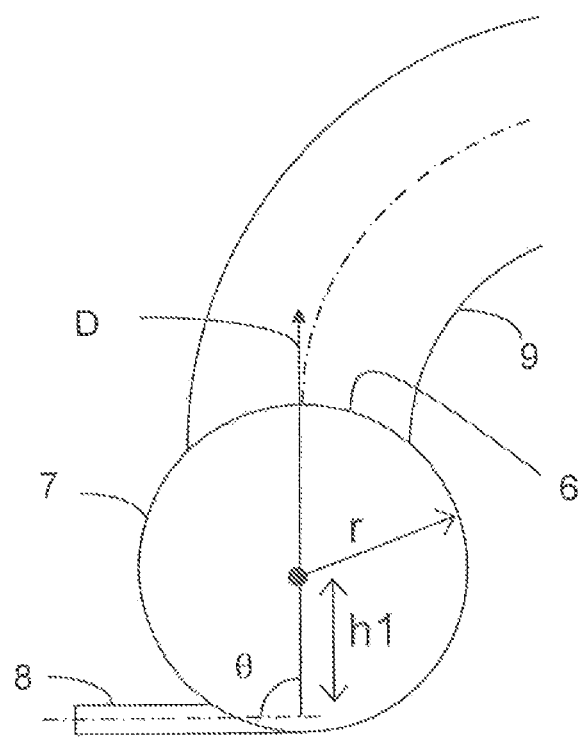
FIGS. 3A, 3B, 3C and 3D show a view of the different arrangements of the injection means of the quenching fluid, according to the invention.

With reference to FIG. 3A, the axis of the injection pipe 8 forms an angle θ of 90° relative to the direction D from the axis of the pipe 9 at the connection 6 between the pipe 9 and the pipe 7. In addition, the axis of the injection pipe 8 is located at a distance h1 that is approximately equal approximately [sic] to the radius of the pipe 7. In other words, the injection pipe 8 is tangent to the wall of the collecting pipe 7.

Figure 3B:
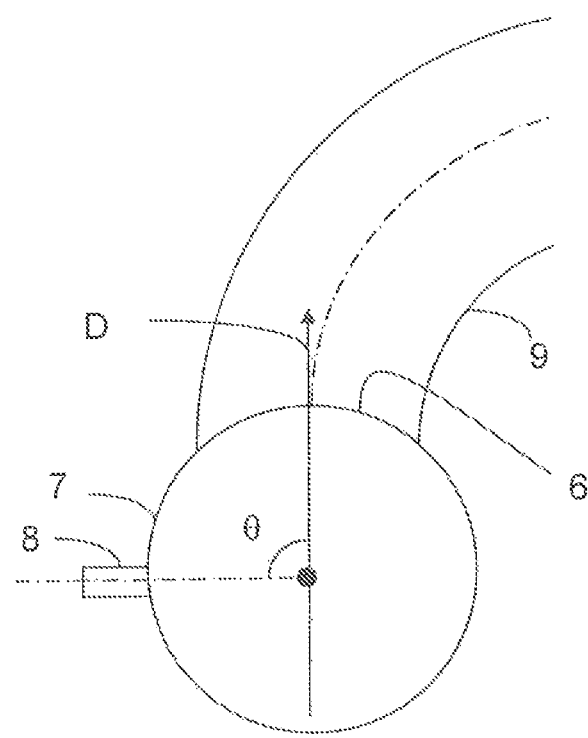

With reference to FIG. 3B, the axis of the injection pipe 8 forms an angle θ of 90° relative to the direction D of the axis of the pipe 9 at the connection 6 between the pipe 9 and the pipe 7. In addition, the axis of the injection pipe 8 crosses the axis of the pipe 7, i.e., the distance h1 is approximately zero.

Figure 3C:
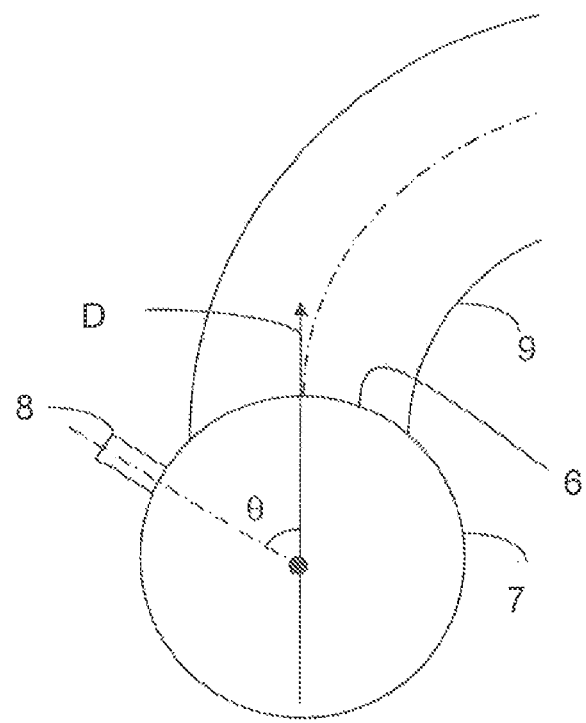

With reference to FIG. 3C, the axis of the injection pipe 8 forms an angle θ of 60° relative to the direction D of the axis of the pipe 9 at the connection 6 between the pipe 9 and the pipe 7. The axis of the injection pipe 8 crosses the axis of the pipe 7, i.e., the distance h1 is approximately zero.

Figure 3D:
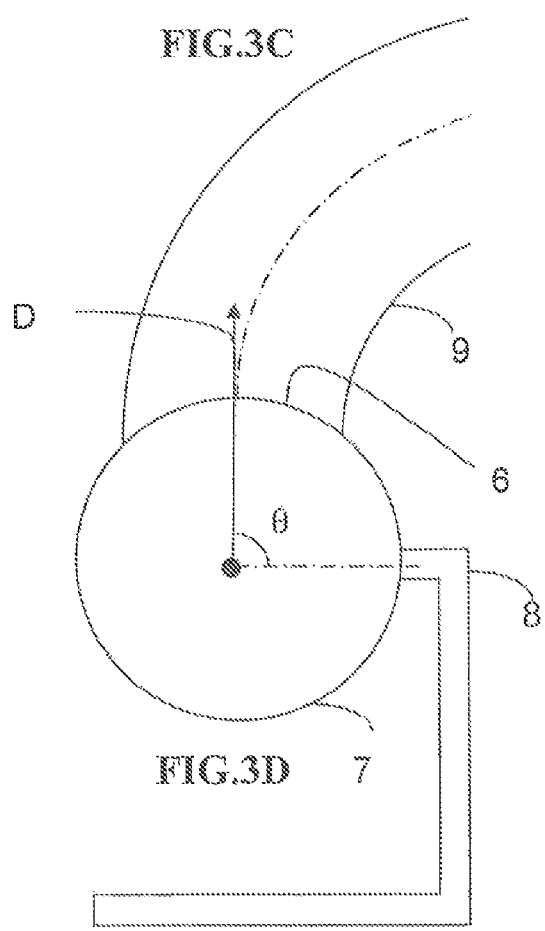

Without exceeding the scope of this invention, the injection pipe 8 can empty into the pipe 7 by the side of the pipe 7 facing the center of the reactor as illustrated by FIG. 3D. Nevertheless, according to the invention, the tube portion of the injection pipe 8 emptying into the pipe 7 forms an angle θ of 90° relative to the direction D of the axis of the pipe 9 at the connection 6 between the pipe 9 and the pipe 7. In addition, the axis of the injection pipe 8 crosses the axis of the pipe 7, i.e., the distance h1 is approximately zero.

Directing the quenching fluid jet along an angle θ of between 45° and 145°, preferably between 80° and 100°, and even of between 85° and 95°, makes it possible to create a recirculation phenomenon, or vortex, of the fluids in the pipe 7, which has the result of improving the mixing between the reaction fluids collected by the collecting plate 5 and the quenching fluid injected by the pipe 8.

Furthermore, the injection means 8 is located at any height in the collecting pipe 7 starting from the opening 6. Preferably, the injection means is located at the connection of the collecting pipe 7 with the input end 6 of the annular mixing chamber 9.

With reference to FIGS. 1 and 2, the annular mixing chamber 9 makes possible the mixing of the reaction fluid with the quenching fluid. Said chamber 9 has an incomplete toroidal shape. It is formed by a bent tube whose axis extends along an arc. It therefore comprises two ends that are separate from one another: one end 6 called an input and a so-called output end 10, opposite to the input end. In this description, the end 6 is also called a connection between the collecting pipe 7 and the mixing chamber 9. The input end 6 is connected to the collecting pipe 7, and the output end 10 is open and makes it possible for the mixture of fluids to flow over the predistribution plate 11. The output end 10 is positioned in the radial direction of the chamber 1 of the reactor. In other words, the output end 10 is inscribed in a vertical plane that is parallel to a radial direction of the chamber 1 of the reactor. Thus, the fluids exiting from the output end 10 are sprayed in the tangential direction of the cross-section of the chamber 1 of the reactor. This arrangement makes it possible to maintain a rotary flow of the mixture of fluids over the predistribution plate 11. Owing to this rotary flow, the reaction fluid or fluids and the quenching fluid can continue to be mixed on the predistribution plate 11.

The diameter and the length of the annular mixing chamber 9 are selected in such a way as to ensure a good mixing between the fluid that is obtained from the bed 2 and the quenching fluid injected by the means 8, while limiting the pressure drop in the collecting pipe and the space requirement in the reactor. The length of the annular mixing chamber is defined by the angle that is formed by the planes passing through the two ends of said chamber. The length of said chamber is between 90 and 270 degrees. In a preferred manner, the length of said chamber is between 100 and 200 degrees, 100 and 250 degrees, and in an even more preferred manner 100 and 180 degrees, 130 and 200 degrees. According to a preferred mode, the mixing chamber 9 according to the invention has the shape of an open ring; the cross-section of said chamber is a circle. In another embodiment of the invention, the cross-section of said chamber can be oval or rectangular. Regardless of the shape of the cross-section of the annular mixing chamber, the diameter (or the height) d of said chamber will be selected in such a way as to limit to the maximum the pressure drop and in such a way as to limit the spatial requirement in the reactor. This diameter d is between 0.05 and 0.5 m, more preferably between 0.1 and 0.3 m, preferably between 0.15 and 0.4 m, even more preferably between 0.15 and 0.25 m, and even more preferably between 0.1 and 0.35 m. The pressure drop of the mixing device according to the invention depends only on the height d of the annular mixing chamber. This pressure drop follows a standard pressure drop law and can be defined by the following equation:

$$\Delta P = \frac{1}{2} \rho_m V_m^2 \chi \qquad (1)$$

where ΔP is the pressure drop, $\rho_m$ is the mean density of the gas+liquid mixture in the annular mixing chamber, $V_m$ is the average speed of the gas+liquid mixture, and $\chi$ is the pressure drop coefficient associated with the mixing device. This coefficient was measured at a value of 2 regardless of the flow conditions. According to a preferred embodiment of the invention, the diameter will be the smallest possible so as to limit the space requirement of the annular mixing chamber on the predistribution plate and to have a more effective mixture at the output of said chamber. For these reasons, it will be preferred to use the smallest possible diameter d that makes it possible to comply with a possible maximum pressure drop criterion. The preferred pressure drop range during the sizing of industrial devices is 0.05 bar<$\Delta P_{max}$<0.5 bar (1 bar=$10^5$ Pa).

The fluids have a rotational movement (or swirling according to English terminology) in the annular mixing chamber 9. This movement promotes the mixing and the homogeneity in temperature of the reaction fluids and the quenching fluid.

The annular mixing chamber 9 is positioned on the periphery of the chamber of the reactor and upstream from the predistribution plate in the direction of flow of the fluids. This positioning of said chamber makes it possible to maximize its length and to obtain an increase in space in the reactor. With the annular mixing chamber having a curved shape, it extends the chamber of the reactor to a distance d1. So that the compact mixing device according to the invention requires the least space possible of the reactor, the distance d1 will be between 0.5% and 25% of the diameter of the reactor, preferably between 0.5% and 10% of the diameter of the reactor, and even more preferably between 1% and 5% of the diameter of the reactor.

In a preferred embodiment, said chamber is in direct contact with said predistribution plate 11. In this configuration, the annular mixing chamber is therefore placed directly on the predistribution plate. In another embodiment, said chamber is located at a distance d2 from the predistribution plate 11. In this case, said chamber will be attached to the plate by attachment means that are well known to one skilled in the art, such as hollow feet. These feet will be positioned in the direction of the flow of the mixture. The distance d2 varies between 0 and 100 mm, more preferably between 0.25 and 100 mm, more preferably between 0 and 50 mm, even more preferably between 0.5 and 30 mm, and even more preferably between 0.5 and 5 mm.

The positioning of the annular mixing chamber 9 on the periphery of the reactor and upstream from the predistribution plate also makes possible a tangential flow of the mixture of fluids above or on the predistribution plate, according to the embodiment of the invention. This tangential flow above said plate makes it possible to optimize the effectiveness of the mixture. Actually, the mixing between the reaction fluid and the quenching fluid continues to be performed at the predistribution plate contrary to the mixing devices described in the prior art in which the mixing is done only in the quenching chamber. Thus, the effectiveness of the compact mixing device according to the invention is increased. A mixture that is homogeneous in temperature and in concentration of the two fluids on the predistribution plate 11 is obtained.

The predistribution plate 11 that is located under the annular mixing chamber 9 consists of a perforated plate and one or more shafts 13. The shaft or shafts 13 is/are located in a preferred manner in the center of the predistribution plate so as not to disrupt the rotary flow of the mixture of fluids on the plate 11. The design of this plate is optimized in such a way as to reduce the pressure drop and to produce a liquid shield of several centimeters. By way of nonlimiting example, the predistribution plate is perforated by 10-mm holes, for example arranged in a triangular span. The predistribution plate 11 extends radially over the entire surface of the reactor and is arranged in the plane that is perpendicular to the longitudinal axis of the chamber. It makes possible a first separation of the mixture; the liquid flows through said holes in the plate 11, and the gas flows through the shaft or shafts 13.

According to an embodiment of the invention, the mixing device according to the invention also comprises a distribution plate 12 arranged downstream, i.e., below the predistribution plate 11. The plate 12 is equipped with a number of mixing means and distributors that make it possible to implement a homogeneous distribution of the cooled reaction fluid over the entire cross-section of the catalytic bed 14 located downstream. The mixing and distributing means can consist of shafts that are each equipped with several openings located at different heights to make possible the passing and the mixing of the gas and liquid. For example, the plate 12 can be produced according to the teaching of the document WO-A-2003/039733.

The examples presented below make it possible to compare the performances of an injection of a quenching fluid into a reactor according to the invention relative to an injection that is not in accordance with the invention.

The flow of two fluids in the annular mixing chamber is simulated according to four different configurations by using fluid-mechanics software (Fluent 14, developed by the company ANSYS Inc., Canonburg, USA). The numerical simulations focused on the analysis of the mixing phenomena in the annular mixing chamber.

Two simulations No. 1 and No. 2 focused on the configurations shown respectively by FIGS. 3A and 3B, in accordance with the invention.

Two simulations No. 3 and No. 4 focused on the configuration shown by FIG. 3C in which θ assumes either the value 45° or the value 135°.

The simulation No. 5 focused on the configuration presented by FIG. 3D. Conventionally, the value of θ is equal to −90°.

Figure 4A:
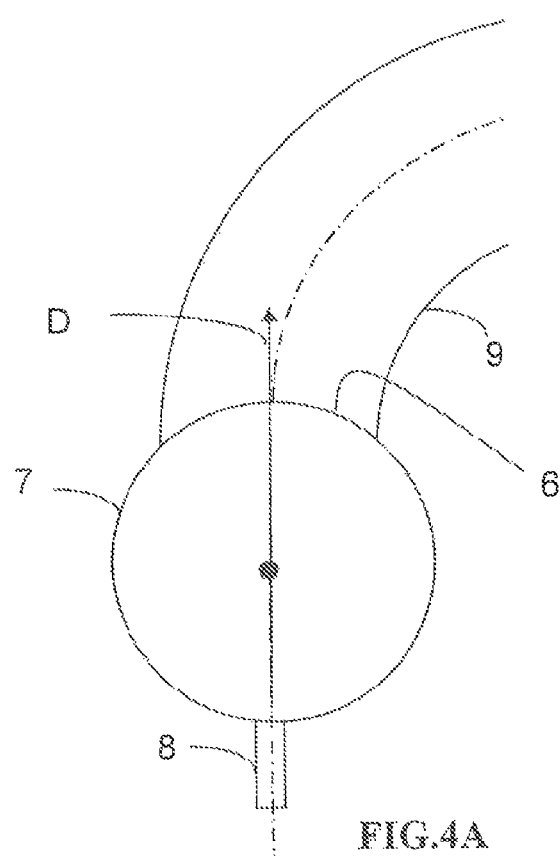
FIGS. 4A and 4B show a view of different arrangements of the injection means of the quenching fluid, not in accordance with the invention.
Figure 4B:
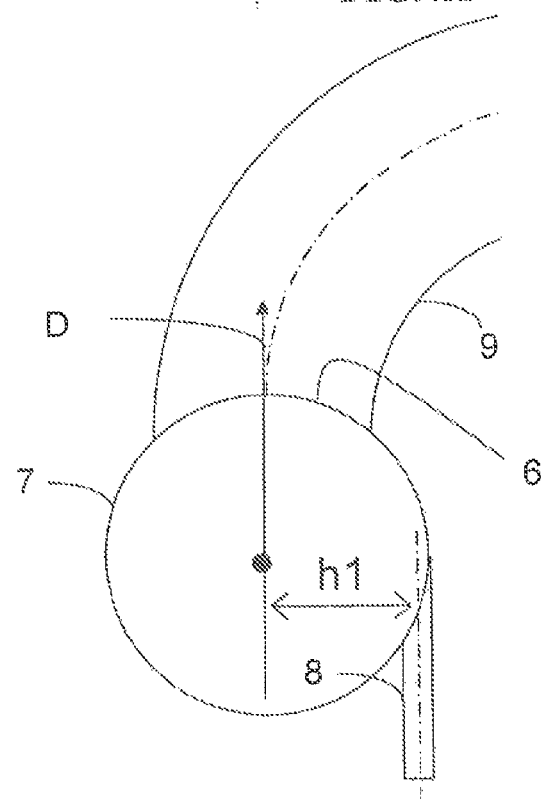

Two simulations No. 6 and No. 7 respectively focused on the configurations shown by FIGS. 4A and 4B, not in accordance with the invention.

Referring to FIG. 4A, the axis of the injection pipe 8 is parallel and therefore forms an angle θ of 0°, relative to the direction D of the axis of the pipe 9 at the connection between the pipe 9 and the pipe 7. The axis of the injection pipe 8 crosses the axis of the pipe 7, i.e., the distance h1 is approximately zero. Referring to FIG. 4B, the axis of the injection pipe 8 is parallel relative to the direction D of the axis of the pipe 9 at the connection between the pipe 9 and the pipe 7. In addition, the axis of the injection pipe 8 is located at a distance h1 that is approximately equal to the radius of the pipe 7. Therefore, the direction D does not form an angle θ relative to the axis of the injection pipe; nevertheless, it is considered that it is a configuration that is equivalent to a configuration having an angle θ of 0°.

For each of the configurations No. 1, No. 2, No. 3, No. 4, No. 5, No. 6 and No. 7, the geometric characteristics are as follows:

| | No. 1 | No. 2 | No. 3 | No. 4 | No. 5 | No. 6 | No. 7 |
|---|---|---|---|---|---|---|---|
| h1 (m) | 0.15 | 0 | 0 | 0 | 0 | 0 | 0.15 |
| r (m) | 0.2625 | 0.2625 | 0.2625 | 0.2625 | 0.2625 | 0.2625 | 0.2625 |
| θ (°) | 90 | 90 | 45 | 135 | −90° | 0 | 0 |

For all of the configurations tested with an injection pipe 8 in the form of a straight tube with an inside diameter equal to 0.225 m [sic]. The mixing chamber 9 has the shape of a ring with an inside diameter that is equal to 52.5 cm and that extends over an arc with a radius that is equal to 220.5 cm, with the arc being open over 180°.

For each of the configurations No. 1, No. 2, No. 3, No. 4, No. 5, No. 6 and No. 7, the numerical simulations consist in introducing a hot flow of reaction fluid that consists of a gas fraction and a liquid fraction into the collecting pipe 7 and in injecting a gaseous quenching fluid via the injection means 8. The simulations are produced by reproducing the operating conditions that are typical of hydrotreatment of a gas oil, with VSL=0.8 cm/s and VSG=10 cm/s.

The characteristics of the fluids are as follows:

| | Flow Rate (m³/s) | Temperature (k) | Density (kg/m3) | Viscosity μ (Cp) | Calorific Capacity (J/kg/k) | Thermal Conductivity Coefficient (W/m/K) |
|---|---|---|---|---|---|---|
| Liquid Fraction of the Reaction Fluid | 0.10 | 573.15 | 800 | 0.4 | 2,859 | 0.09 |
| Gas Fraction of the Reaction Fluid | 0.63 | 573.15 | 20 | 0.015 | 11,411 | 0.312 |
| Gaseous Quenching Fluid | 0.63 | 323.15 | 20 | 0.015 | 11,411 | 0.312 |

The results of the numerical simulations are exploited via two criteria that make it possible to characterize the performances of the tested configurations.

The first criterion $\eta L$ is defined as: $\eta L = \dfrac{\text{Deviation type } T_{L,output}}{\Delta T_{G,Linput}}$ The second criterion $\eta GL$ is defined by $\eta_{GL} = \dfrac{(T_{L,MAX} - T_{G,MIN})_{output}}{\Delta T_{G,Linput}}$ $T_{L,output}$ corresponds to the temperature of the liquid fraction at the output of the annular mixing chamber 9.

$T_{G,Linput}$ corresponds to the difference between the temperature of the reaction fluid and the temperature of the quenching fluid.

$T_{L,MAX}$ corresponds to the maximum temperature measured on the liquid fraction at the output of the annular mixing chamber 9.

$T_{G,MIN}$ corresponds to the minimum temperature measured on the gas fraction at the output of the annular mixing chamber 9.

$\eta L$ is equal to zero when the temperature of the liquid is homogeneous at the ring output. It is a criterion relative to the quality of the mixture in the liquid phase, which it is desired to minimize.

$\eta GL$ is equal to zero when the temperatures in the gas phase and the liquid phase are identical. It is a criterion relative to the quality of the heat transfer between the two phases, which it is also desired to minimize.

Figure 5:
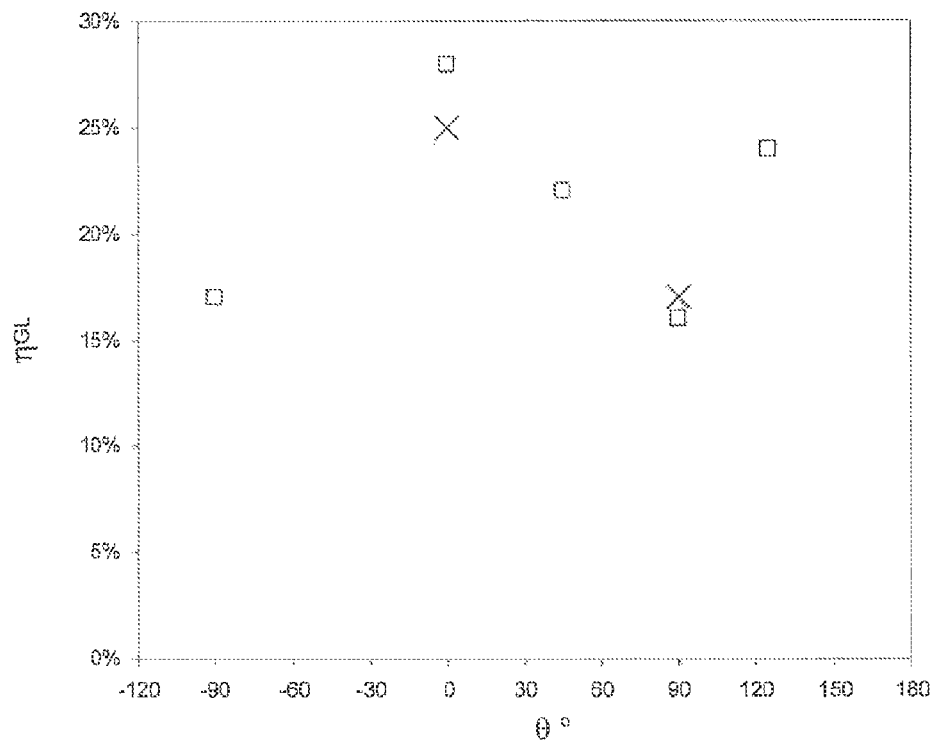
FIG. 5 shows the effectiveness of two-phase thermal mixing between the liquid and vapor phases of different devices, based on the injection angle $\theta$ of the quenching fluid.

The results for the criterion $\eta GL$ are presented by FIG. 5. The white circles correspond to configurations with h1=0, and the x's correspond to the configurations with h1=0.15.

Figure 6:
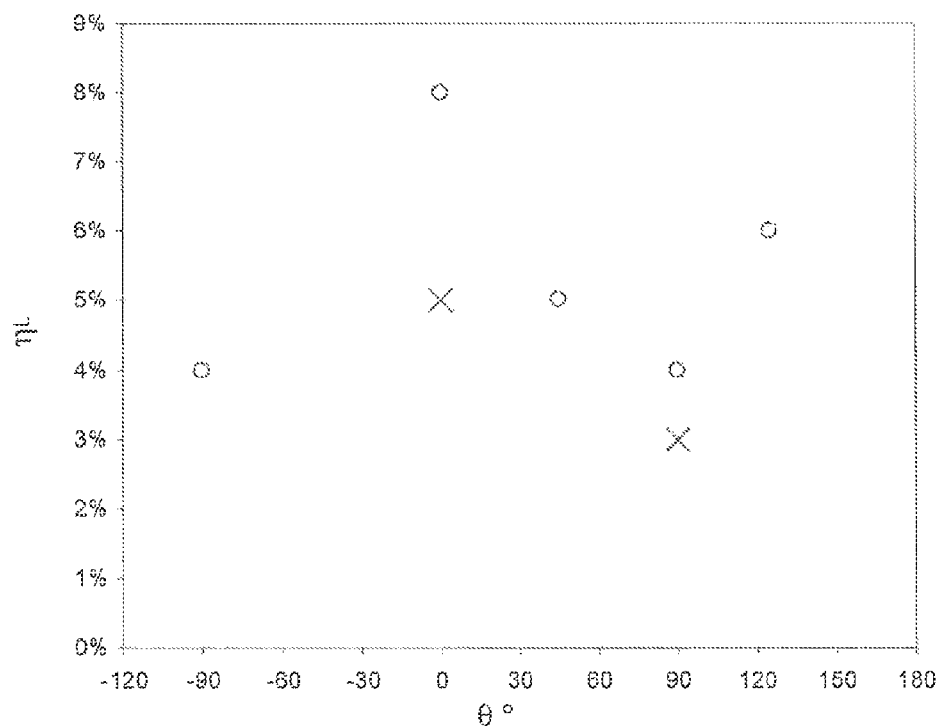
FIG. 6 shows the effectiveness of thermal mixing of the liquid phase of different devices based on the injection angle $\theta$.

The results for the criterion $\eta L$ are presented by FIG. 6. The white squares correspond to the configurations with h1=0, and the x's correspond to the configurations with h1=0.15.

It clearly appears that the configurations for which the angle is equal to 90° or −90° are the best. Furthermore, the distance h1 that makes the injection of the quenching fluid more tangential or not to the collecting pipe 7 has a lower impact.

To minimize $\eta L$, it is preferable to use an injection means that is tangent to the collecting pipe 7, i.e., h1 is approximately equal to 0.15, whereas to minimize $\eta GL$, it is preferable to center the injection on the collecting pipe 7, i.e., h1 is approximately zero.

The invention claimed is:

1. A catalytic reactor with downward flow comprising: a chamber (1) containing at least two solid catalyst beds (2, 14) separated by an intermediate zone comprising a device for mixing fluids, said device comprising:
at least one essentially horizontal collecting plate (5) communicating with a vertical collecting pipe (7) for receiving fluids collected by said collecting plate (5),
at least one means for injecting a quenching fluid (8) emptying into said collecting pipe (7),
an annular mixing chamber (9) located below the plate (5), said mixing chamber (9) comprising an input end (6) directly connected to said vertical collecting pipe (7) and an output end (10) for evacuating fluids, and
a predistribution plate (11) comprising a number of perforations and comprising at least one shaft (13), said predistribution plate (11) being located below said mixing chamber (9),
wherein said means for injecting a quenching fluid (8) comprises a tubular portion that is connected to and empties into said vertical collecting pipe (7), and said tubular portion having an axis at the end of the tubular portion that is connected to said vertical collecting pipe (7), wherein said axis of said tubular portion forms an angle θ with a direction D, and wherein direction D corresponds to the direction of the axis of said mixing chamber (9) at the connection between said mixing chamber (9) and said vertical collecting pipe (7), and wherein said angle θ is between 45° and 135°.

2. The reactor according to claim 1, wherein the axis said tubular portion is essentially horizontal.

3. The reactor according to claim 1, wherein the angle θ is between 80° and 100°.

4. The reactor according to claim 1, wherein said vertical collecting pipe (7) has a circular cross-section and wherein said means for injecting a quenching fluid (8) is arranged in such a way that the distance h1 between said axis of said tubular portion and said axis of said vertical collecting pipe (7) is between 0 and the radius of said vertical collecting pipe.

5. The reactor according to claim 4, wherein said distance h1 is equal to 0 and said axis of said tubular portion crosses said axis of said vertical collecting pipe (7).

6. The reactor according to claim 4, wherein said distance h1 is equal to approximately the radius of said vertical collecting pipe (7) and said axis of said tubular portion is tangential to the wall of said vertical collecting pipe (7).

7. The reactor according to claim 1, wherein said predistribution plate (11) is located below said mixing chamber (9) at a distance d2 of between 0 and 100 mm.

8. The reactor according to claim 7, wherein said distance d2 is equal to 0 mm, and said mixing chamber (9) is in contact with said predistribution plate (11).

9. The reactor according to claim 7, wherein the distance d2 is between 0.25 and 100 mm.

10. The reactor according to claim 1, wherein said mixing chamber (9) is positioned on the periphery of the chamber (1) of the reactor.

11. The reactor according to claim 10, wherein said annular chamber (9) consists of a portion of a pipe having an axis in the shape of an arc.

12. The reactor according to claim 11, wherein said annular mixing chamber (9) is positioned at a distance d1 from the chamber (1) of the reactor, with the distance d1 varying from 0.5% to 25% of the diameter of the chamber (1) of the reactor.

13. The reactor according to claim 11, wherein the diameter d of said annular mixing chamber (9) is between 0.05 and 0.5 m.

14. The reactor according to claim 11, wherein the length of said mixing chamber (9) is defined by the angle that is formed by the planes passing through the two ends of said mixing chamber and said angle is between 90 and 270 degrees.

15. The reactor according to claim 1, further comprising an essentially horizontal distribution plate (12) positioned below said predistribution plate (11).

16. A process for using a reactor according to claim 1, comprising: circulating at least one reaction fluid from the top to the bottom of said reactor (1) through said at least two solid catalyst beds (2, 14) and injecting a quenching fluid is injected into said means for injecting a quenching fluid (8).

17. The reactor according to claim 7, wherein the distance d2 is between 0.5 and 5 mm.

18. The reactor according to claim 11, wherein the diameter d of said annular mixing chamber (9) is between 0.1 and 0.3 m.

19. The reactor according to claim 11, wherein the diameter d of said annular mixing chamber (9) is between 0.15 and 0.25 m.

20. The reactor according to claim 11, wherein the length of said mixing chamber (9) is defined by the angle that is formed by the planes passing through the two ends of said mixing chamber and said angle is between 100 and 250 degrees.

21. The reactor according to claim 11, wherein the length of said mixing chamber (9) is defined by the angle that is formed by the planes passing through the two ends of said mixing chamber and said angle is between 130 and 200 degrees.

* * * * *